(12) United States Patent
Ninos (10) Patent No.: US 9,880,787 B2
(45) Date of Patent: Jan. 30, 2018

(54) SYSTEM AND METHOD FOR MEMORY PATCHING CIRCUITS

(71) Applicant: Dialog Semiconductor B.V., 's-Hertogenbosch (NL)

(72) Inventor: Konstantinos Ninos, Athens (GR)

(73) Assignee: Dialog Semiconductor B.V., 's-Hertogenbosch (NL)

(*) Notice: Subject to any disclaimer, the term of this patent is extended or adjusted under 35 U.S.C. 154(b) by 0 days.

(21) Appl. No.: 14/819,515

(22) Filed: Aug. 6, 2015

(65) Prior Publication Data

US 2017/0039056 A1 Feb. 9, 2017

(51) Int. Cl.
*G06F 9/44* (2006.01)
*G06F 3/06* (2006.01)
*G06F 9/445* (2006.01)

(52) U.S. Cl.
CPC .......... *G06F 3/0673* (2013.01); *G06F 3/0619* (2013.01); *G06F 3/0653* (2013.01); *G06F 8/66* (2013.01)

(58) Field of Classification Search
CPC ......... G06F 8/65; G06F 3/0619; G06F 3/0673
USPC ................... 717/168–178; 709/203
See application file for complete search history.

(56) References Cited

U.S. PATENT DOCUMENTS

| 4,028,679 | A | * | 6/1977 | Divine | G06F 8/66 |
| | | | | | 711/115 |
| 5,802,549 | A | * | 9/1998 | Goyal | G06F 12/0638 |
| | | | | | 711/102 |
| 6,049,672 | A | * | 4/2000 | Shiell | G06F 8/66 |
| | | | | | 711/102 |
| 6,111,584 | A | * | 8/2000 | Murphy | G06T 15/04 |
| | | | | | 345/506 |
| 6,135,651 | A | * | 10/2000 | Leinfelder | G06F 8/66 |
| | | | | | 712/E9.015 |
| 6,463,583 | B1 | * | 10/2002 | Hammond | G06F 9/44521 |
| | | | | | 714/E11.207 |
| 6,499,137 | B1 | * | 12/2002 | Hunt | G06F 9/443 |
| | | | | | 712/E9.084 |
| 6,817,015 | B2 | * | 11/2004 | Takata | G06F 8/66 |
| | | | | | 711/103 |
| 6,901,587 | B2 | * | 5/2005 | Kramskoy | G06F 8/4442 |
| | | | | | 711/118 |
| 6,915,513 | B2 | * | 7/2005 | Duesterwald | G06F 8/67 |
| | | | | | 717/168 |
| 7,269,707 | B2 | * | 9/2007 | Menon | G06F 8/66 |
| | | | | | 711/102 |
| 7,373,446 | B2 | * | 5/2008 | Post | G06F 9/45537 |
| | | | | | 710/261 |

(Continued)

OTHER PUBLICATIONS

Calcagni et al, "Patchable Control Store for Reduced Microcode Risk in a VLSI VAX Microcomputer", IEEE, pp. 70-76, 1984.*

(Continued)

*Primary Examiner* — Anil Khatri
(74) *Attorney, Agent, or Firm* — Saile Ackerman LLC; Stephen B. Ackerman (57) ABSTRACT

A patching system and a patching circuit provide a type of patching entry which can replace several sequential memory positions with hardcoded and dynamically configured assembly instructions, thus injecting a small piece of code. The operation of the injected code can be for any purpose, but as an example may be used to seamlessly redirect the execution flow of a processing unit.

23 Claims, 5 Drawing Sheets

(56) References Cited

U.S. PATENT DOCUMENTS

| | | | | |
|---|---|---|---|---|
| 7,386,846 | B2* | 6/2008 | Rajaram | G06F 8/65 717/126 |
| 7,739,469 | B2* | 6/2010 | Jessani | G06F 9/32 711/103 |
| 7,890,946 | B2* | 2/2011 | Blumfield | G06F 8/65 717/126 |
| 8,055,096 | B2* | 11/2011 | Dahms | G06F 8/68 382/282 |
| 8,245,216 | B2* | 8/2012 | Felts | G06F 8/65 717/169 |
| 8,438,558 | B1* | 5/2013 | Adams | G06F 8/68 717/168 |
| 8,689,204 | B2* | 4/2014 | Kreek | G06F 8/64 711/102 |
| 8,850,421 | B2* | 9/2014 | Proud | H01F 38/14 717/172 |
| 9,268,552 | B1* | 2/2016 | Kiiskila | G06F 8/65 |
| 2008/0112205 | A1 | 5/2008 | Saado | |
| 2014/0289455 | A1 | 9/2014 | Verhallen et al. | |

OTHER PUBLICATIONS

Wagner et al "CASPAR: Hardware Patching for Multicore Processors", ACM, pp. 658-663, 2009.*

Marinescu et al, "KATCH: High-Coverage Testing of Software Patches", ACM, pp. 235-245, 2013.*

Soltanifar et al, "Predicting Defectiveness of Software Patches", ACM, pp. 1-10, 2016.*

Diku et al, "Semantic Patch Inference", ACM, pp. 382-385, 2012.*

Cotroneo et al, "Towards Patching Memory Leak Bugs in Off-The-Shelf Software", IEEE, pp. 433-436, 2014.*

Philippaerts et al, "CPM: Masking Code Pointers to Prevent Code Injection Attacks", ACM Transactions on Information and System Security, vol. 16, No. 1, Article 1, pp. 1-27, 2013.*

Leon et al, "Cache Injection for Parallel Applications", ACM, pp. 15-26, 2011.*

Sidiroglou et al, "Assure: Automatic Software Self-healing Using REscue points", ACM, pp. 1-12, 2009.*

Dotzler et al, "Annotation Support for Generic Patches", IEEE, pp. 6-10, 2012.*

Nair et al, " Refresh Pausing in DRAM Memory Systems", ACM Transactions on Architecture and Code Optimization, vol. 11, No. 1, article 10, pp. 1-26, 2014.*

Shu et al, "An automatic image based modeling system by patch growing", ACM, pp. 83-88, 2009.*

"NEC Intrared Transmission Protocol," Altium, Nov. 6, 2013, 2 pgs, found: http://techdocs.altium.com/display/FPGA/NEC+Infrared+Transmission+Protocol#comment-0.

German Office Action, File Number: 10 2015 222 096.6, Applicant: Dialog Semiconductor B.V., dated: Oct. 21, 2016, 13 pgs, and English language translation, 11 pgs.

* cited by examiner

SYSTEM AND METHOD FOR MEMORY PATCHING CIRCUITS

FIELD

The present disclosure relates to a memory patching circuit, system and method.

BACKGROUND

It is known to use non-volatile memory (NVM) in processors, computers, and other kinds of devices where information needs to be stored persistently (not being erased by a power cycle). There are various types of NVM, including read-only memory (ROM) such as programmable read-only memory (PROM), erasable programmable read-only memory (EPROM), electrically erasable programmable read-only memory (EEPROM) or one-time programmable (OTP) NVM, to give some examples.

The majority of the Systems on Chip (SoC) that include a processing unit also include a type of ROM to store software functions or tables of data. A stored collection of functions usually implements a software library which can be used by an application executed by the processing unit. The storage of a library in ROM reduces the required silicon area that it is needed to store a specific software code on-chip, reducing thus the final cost of the SoC product.

Data stored in ROM and other types of NVM cannot be easily altered. However there are cases where it is desired to alter the contents of this type of memory. For example, there are cases where the software functions stored in ROM do not behave as expected. This can be very serious if a bug is only found after the manufacturing of the SoC. Because the information stored in the ROM is mask-programmed, it is not possible to change and fix those functions.

As a solution to this it has been proposed to provide ROM patching mechanisms, which prevent execution of defective code in the ROM by the processor and provide corrected code which is executed instead.

There are software based patching mechanisms that make use of specific software structures in order to provide the patching feature. They typically select a very limited number of functions located in ROM, which suspected as being prone to failure or may be critical for the system operation. Then they can replace all the calls to this limited number of functions with a code that fetches the final base address from a table located in the RAM. Another solution is to replace all the calls to these functions with a call to "hook" functions, one for each function to be able to be patched, which are located in RAM and include only a call to the final function body. If after the manufacturing of the SoC an error will be detected in these functions, then the table with the function pointers, or the alternative hook functions could be modified, redirecting thus to the correct function located in RAM, replacing the one in ROM. Other similar implementations may be used as well, but a drawback of the software based solutions is that they require more area in the code memory, they consume more execution cycles (reducing thus the response time of the system) and they provide the option to patch only a limited number of functions.

A hardware based patching system has been disclosed in US 2014/0289455, in which an address register stores an address referring to a word located in ROM, which corresponds to a word that needs to be patched, which stores either instructions or data. Another data register stores a single data word or instruction to be used in place of the defective data stored in the ROM. The hardware tracks all the transactions on the system bus, and when there is a memory transaction referring to the address that has been programmed to the address register, then the patch circuit replaces the data on the bus with the word programmed in the data register. Patching directly from the data register means that the processing unit's execution delay is not affected by the patching. However, this system requires a lot of extra area on the circuit substrate and only allows for a limited number of memory positions to be patched. Also, in case of patching a function, the efficiency of this circuit is strongly dependent on the Instruction Set Architecture (ISA) of the given processing unit.

SUMMARY

It would be advantageous to have an improved circuit for patching a memory, for non-volatile memory, and also for volatile memory.

According to a first aspect of the disclosure there is provided a memory patching circuit. The circuit contains a code generation unit coupled with a memory via an input data bus and coupled with a processor via an output data bus. The circuit also contains an address memory storing an address of a location in the memory to be patched and a distance calculator unit arranged to receive a first address from an address bus connecting the memory and the processor and to receive a second address from the address memory to compare the first and second addresses, and output a distance indication based on the comparison, the code generation unit is arranged to receive the distance indication and to either pass through data from the input data bus to the output data bus or to inject code to the output data bus, based on the distance indication.

Optionally, the code generation unit is arranged to receive the address from the address memory to determine the location for the injected code.

Optionally, the distance calculator is arranged to subtract the first address from the second address and provide a signed value as the distance indication.

Optionally, the distance calculator unit comprises a plurality of subtractors each coupled to the address bus and arranged to subtract successive offsets from the first address.

Optionally, the distance calculator unit comprises a plurality of comparators each coupled with one of said subtractors, and the outputs of the comparators provide the distance indication.

Optionally, the distance calculator unit comprises a plurality of adders each coupled to the address memory and arranged to add successive offsets from the second address.

Optionally, the distance calculator unit comprises a plurality of comparators each coupled with one of said adders, and the outputs of the comparators provide the distance indication.

Optionally, the distance indication indicates whether the logical distance between the first address and the second address is within a predetermined range.

Optionally, if the logical distance between the first address and the second address is within the predetermined range, the distance indication represents the distance and, if the logical distance between the first address and the second address is not within the predetermined range, the distance indication indicates that no address within the range has been found.

Optionally, the memory patching circuit comprises a control signal generator which sends a control signal to enable or disable operation of the memory patching circuit.

Optionally, the control signal generator comprises a control memory and a configuration unit arranged to write a value to the control memory.

Optionally, the control signal generator is coupled with the distance calculator unit.

Optionally, a control signal for disabling the memory patching circuit or disabling the patching entry associated with the distance calculator unit, causes the distance calculator unit to output a distance indication indicating that no address within the range has been found.

Optionally, the control signal generator is coupled with the code generation unit.

Optionally, a control signal for disabling the memory patching circuit or disabling a specific patching entry, causes the code generation unit to ignore any positive distance indication within the predetermined limits to be ignored, considering that no matching has been detected from the disabled patching entry, regardless of the output of the corresponding comparison unit.

Optionally, the memory patching circuit comprises a configuration unit for storing a memory address in the address memory.

Optionally, the memory patching circuit comprises a plurality of patching groups, each group comprising an address register and a distance calculator unit.

Optionally, each patching group further comprises a control register for outputting a control signal.

Optionally, the memory patching circuit comprises a memory storing a table with pointers to replacement functions, one for each patch group.

Optionally, the code generation unit comprises an instruction generation unit arranged to implement a required sequence of instruction opcodes in order to implement the predefined injected code.

Optionally, the code generation unit comprises a decision unit arranged to receive distance indications from the or each distance calculator unit and to control the data output to the output data bus based on the received distance indications.

According to a second aspect of the disclosure there is provided a system comprising: a memory; a processor; an address bus coupled between the memory and the processor; and a memory patching circuit comprising: a code generation unit coupled with a memory via an input data bus and coupled with a processor via an output data bus; an address memory storing an address of a location in the memory to be patched; a distance calculator unit arranged to: receive a first address from an address bus connecting the memory and the processor, receive a second address from the address memory, compare the first and second addresses, and output a distance indication based on the comparison; wherein the code generation unit is arranged to receive the distance indication and to either pass through data from the input data bus to the output data bus or to inject code to the output data bus, based on the distance indication.

According to a third aspect of the disclosure there is provided a method of patching a memory comprising replacing a plurality of memory positions with hardcoded assembly instructions.

Optionally, the method comprises dynamically generating the hardcoded assembly instructions.

Optionally, the method comprises: at a distance calculator unit; receiving a first address from an address bus connecting a memory and a processor, receiving a second address from an address memory, comparing the first and second addresses, and obtaining a distance indication based on the comparison; and at a code generation unit; either passing through data from an input data bus to an output data bus or injecting code to the output data bus, based on the distance indication.

BRIEF DESCRIPTION OF THE DRAWINGS

The disclosure will be described below, by way of example only, with reference to the accompanying drawings, in which.

DETAILED DESCRIPTION

Patching may be required for code of any type, but it is useful to consider three main categories. The first is to patch a data value (a data patch), the second is to patch a specific small sequence of assembly instructions (an instruction patch) and a third is to patch a complete function, replacing it completely with another one (a function patch).

All processing units (CPUs) provide to their Instruction Set Architecture (ISA) instructions for handling the execution flow. The usual case is either to provide no direct solution for the "Function Patching" problem or to provide a solution which introduces some limitations to the structure of the software.

The present disclosure provides a patching system and a patching circuit by providing a new type of patching entry which can replace several sequential memory positions with hardcoded and dynamically configured assembly instructions, thus injecting a small piece of code. The operation of the injected code can be for any purpose, but as an example may be used to seamlessly redirect the execution flow of a processing unit.

A proposed solution is to maintain in an on-chip memory (such as a SRAM) a table with pointers to replacement functions, one for each hardware function patch entry. Whenever the hardware detects an address match, it will inject a small assembly code replacing the first instructions of the problematic function and redirecting the execution to the function declared at the aforementioned table.

The disclosure provides the possibility to maximize patching capabilities while keeping the extra silicon area as small as possible.

Figure 1:
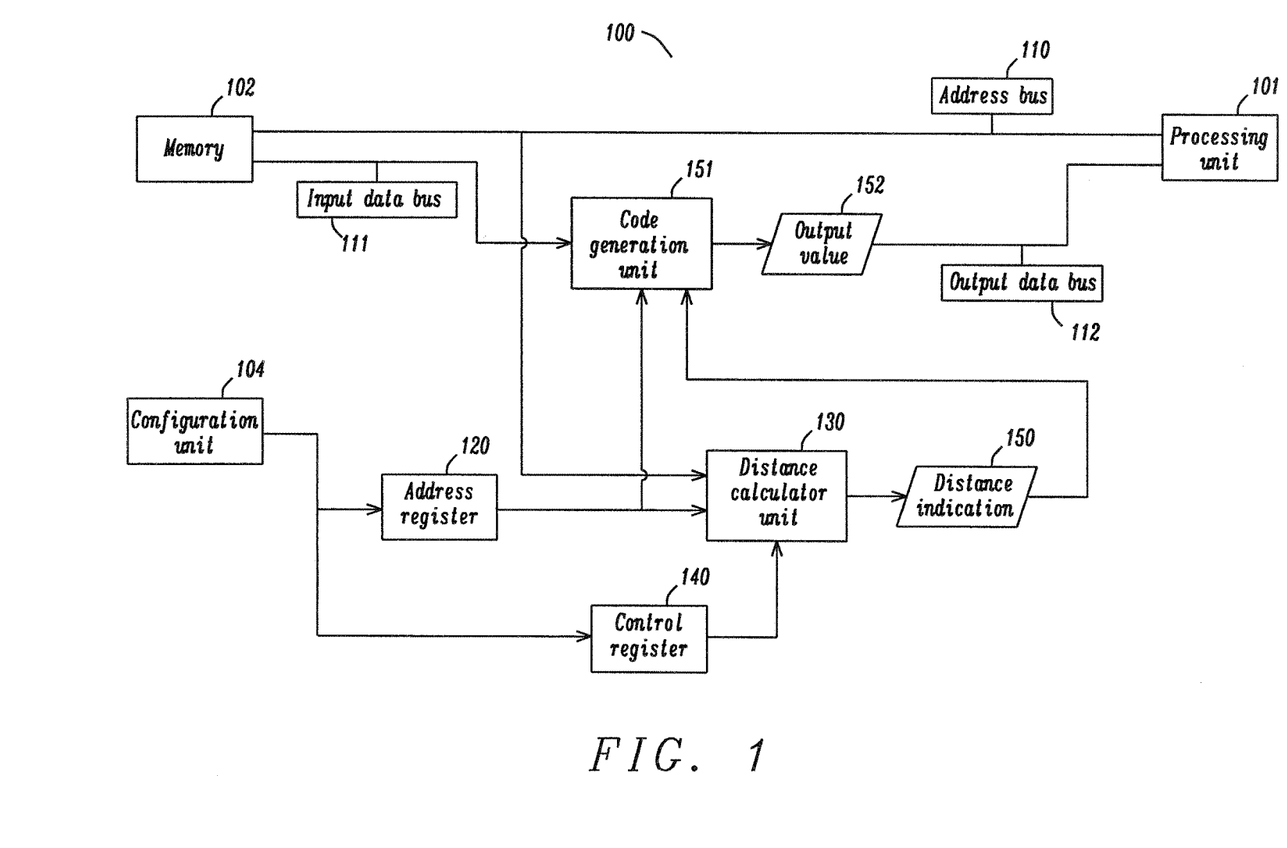
FIG. 1 is a diagram illustrating aspects of a system for patching a memory including a patching circuit.

FIG. 1 is a diagram illustrating aspects of a patching system 100 for patching a memory 102, the system including a patching circuit. Although the system is described herein in detail, it will be understood that for many features described herein, alternative solutions may be used without departing from the scope of the disclosure. The memory 102 may be a memory of any kind and may be implemented in any technology. The memory 102 may be a non-volatile memory. For instance, the memory 102 may be a flash memory, a Read-Only-Memory (ROM), PROM, EPROM, EEPROM, or any other kind of non-volatile memory. The memory 102 may further be a memory such as Ferroelectric Random Access Memory (FeRAM), conductive-bridging RAM (CBRAM), phase-change RAM (PRAM), silicon-oxide-nitride-oxide-silicon (SONOS), resistive RAM (RRAM), Racetrack memory, nano-RAM (NRAM), Millipede, etc. The memory 102 may be a volatile memory, for example, it may be a RAM, dynamic RAM (DRAM), static RAM (SRAM), zero-capacitor RAM (Z-RAM), twin-transistor RAM (TTRAM), advanced RAM (A-RAM), ETA RAM (manufactured by Eta Semiconductor Inc), universal serial bus (USB) memory, etc. The memory may be organized in any suitable way.

The memory 102 stores code to be executed by a processing unit 101. Information is exchanged between the memory 102 and the processing unit 101 via an address bus 110 and a data bus. If no patching circuit was provided, a data bus would be coupled directly between the memory 102 and the processing unit 101 (or between input data bus 111 and output data bus 112 shown in the figure). However, according to the present disclosure, a code generation unit 151 is interposed between the memory 102 and the processing unit 101. The code generation unit 151 receives data from the memory 102 via an input data bus 111 and sends an output value 152 to the processing unit 101 via an output data bus 112. The input data bus 111 and the output data bus 112 may use any physical arrangement. It may use a parallel or a bit serial connection or any kind of suitable connection to the processing unit 101. The output data bus 112 may have or may have not the same or similar arrangement as the input data bus 111.

The memory 102 receives an address input 110 which indexes a unique location in the memory area. This location may store a data word of any size, counted in number of bits, or any other encoding format. All memory locations should store the same amount of information per stored location, which may be represented with the same number of bits per word. This disclosure is applicable for any memory organization and any word sizes represented with any number of bits.

In the following description we consider an example of a system with 32 bits (4 bytes) per word, and where each address bus value indexes 1 byte. The address bus values are always multiples of 4, indexing thus always a word of 4 bytes. It may also be considered that any arithmetic operation, like addition or subtraction, on an address value will be in multiples of 4 in order to always generate a new address value that indexes an aligned word of 4 bytes. It is to be appreciated that this specific example system does not limit the scope of the disclosure.

The processing unit 101 may comprise a bus master unit, for instance, it may comprise the memory interface stage of a central processing unit CPU or a cache controller or a direct memory access (DMA) controller or a bus bridge interconnecting two or more bus interfaces or whatever controller incorporates a bus master unit in its design.

The patching system may comprise an address register 120 configured to store a memory address. The address register 120 may comprise any number of bits for holding addresses of any possible size. The size of the address register 120 may correspond to the size of an address bus 110 or may be smaller if it may be sufficient to index the patched memory area, which may be part or all the storage area of memory 102. The memory address in the address bus 110 and in the address register 120 may identify an address in a memory 102.

The patching system 100 may optionally include a distance calculator unit 130 which is a circuit arranged to receive a first address and a second address, to compare the first and second addresses and to output a distance indication based on the comparison. The value may be an address value, a value corresponding to the number of memory array positions between the address values, or any other representation of the distance. The distance calculator unit 130 is arranged to receive a first address from the address bus 110, compare it with a second address from address register 120, and provide an output distance indication 150.

The distance indication 150 may be an indication of the result of a comparison performed by the distance calculator unit 130. For instance, if the first and the second addresses match, based on the comparison performed, the distance indication 150 may be a value of zero ("0") or any kind of signal representing the exact matching result, and if the first and the second values do not match, based on the comparison performed, the distance indicator signal may be a negative or positive value or any kind of signal representing the distance between the addresses of the address register 120 and the address bus 110. The distance may be counted in words, or half-words, or bytes depending on the Instruction Set Architecture (ISA) of the given processing unit 101 and the requirements of the code generation unit 151.

Alternatively, the distance indication 150 may indicate whether a logical distance between the first address and the second address is within a predetermined range or not. If it is within the predetermined range, the distance indication 150 may represent the distance. If it is not within the predetermined range, the distance indication 150 may be configured to provide an error message or specific value that indicates that no address within the range has been found. The distance indication value may be received by the code generation unit 151 which then makes a decision based on the value depending on whether the value is within a predetermined range or not.

The distance calculator unit 130 may comprise any suitable circuitry for receiving the addresses and outputting a distance indication. For example, according to a first distance calculator embodiment, the distance calculator unit 130 may be arranged to subtract the address received from the address bus 110 from the address stored in the address register 120 and provide a signed value as a result which forms the distance indication 150.

According to a second distance calculator embodiment, the distance calculator unit 130 could comprise k−1 subtractors each coupled to the address bus 110 and arranged to subtract successive offsets from the value output on the address bus 110. In the example 32-bit system mentioned above, a first subtractor will provide the address bus 110 minus 4, a second subtractor will provide the address bus 110 minus 8, and any successive subtractors will provided the address bus 110 minus successive multiples of 4.

The value k is the number of words needed to implement the injected instruction sequence to be generated by the code generation unit 151. The k address values from the k−1 subtractors and the address bus 110 could be compared with the address register 120 by using k comparators. The output of the k comparators may provide the distance indication 150.

According to third distance calculator embodiment, the distance calculator unit 130 may comprise k−1 adders coupled with the address register 120, and arranged to add successive offsets from the value of the address register 120. In the example 32-bit system mentioned above, a first adder will provide the address register 120 plus 4, a second adder will provide the address register 120 plus 8, and any successive adders will provided the address bus 110 plus successive multiples of 4 The value k represents the same number as described in the second distance calculator embodiment. The k address values from the k−1 adders and the address register 120 could be compared with the address bus 110 by using k comparators. The output of the k comparators may provide the distance indication 150.

The distance calculator unit 130 could be also implemented with several other circuit architectures. It is also possible to not apply the distance calculation logic 130 over all the bits of address bus 110, but only to the ones that carry the required information to index the portion of the memory 102 on which the patching mechanism is to be applied. This reduces thus the substrate area and the latency of the circuit as compared with the case of applying the distance calculation logic 130 over all the bits of address bus 110. From the aforementioned three distance calculator embodiments, the first two take up less substrate area compared with the third one, especially when there are multiple address registers 120. The third implementation may introduce the minimum latency to the system. The choice of distance calculator implementation architecture depends on the system requirements and the restrictions of the given manufacturing process and standard cell library, like the final used substrate area and the final latency that the circuit will introduce to the system.

The patching system may further comprise a configuration unit 104. The configuration unit 104 may be configured for receiving any kind of data or memory address or control data. The configuration unit 104 may be further configured to store the memory address in the address register 120 or to store a value in the control register 140.

The patching system may comprise a control register 140. The control register 140 may be configured to store an indication of whether the patch entry represented by address register 120 and distance calculation unit 130 is enabled, or whether the patching circuit as a whole (including a plurality of patch entries as will be discussed below) is enabled. The indication may be any kind of suitable indication, for instance, one of the bits of the control register may contain a "0", that may indicate that the patching entry or circuit is not enabled. It may be connected either to the code generation unit 151 or to the comparison unit 130, without affecting the final functionality of the system. Considering that it is connected to the distance calculator unit 130 and that the patching entry or circuit is not enabled, the distance calculator 130 may be further configured to provide a distance indication 150 value of "not valid", or "distance too large", or whatever encoding will signal to the code generation unit 151 to select the value from the input data bus 111 as the output value 152, regardless of the relationship between the two address values provided to the distance calculator 130.

The system may comprise a code generation unit 151. The code generation unit 151 may be configured to receive a first value. The first value may come from an input data bus 111 or from any other kind of device. The input data bus 111 may be implemented in any technology. The input data bus 111 may be coupled with the memory 102 and/or may be used to read from the memory 102 in such a way that the memory 102 may put the data stored in the memory at the address given by the bus address 110 in the input data bus 111.

The code generation unit 151 may be configured to receive a second value. The second value may be portion of the address register 120. This input may be used to decide the location of the injected instruction sequence into the input data bus 111 in order to generate the final output value 152.

The code generation unit 151 may be configured to receive a third value. The third value may be the distance indication 150.

The code generation unit 151 may be further configured for sending the output value 152 to an output data bus 112 or to any system or device that transfers data.

The patching process is desirable and feasible to be transparent to the processing unit 101, as it can be implemented in such a way that does not change the processing unit interface with the memory 207 via memory controller 206. It is also feasible to provide the output value 152 with the minimum possible latency, allowing the replacement of the input data bus value 111 within the same access cycle, avoiding thus the introduction of any wait cycle to the bus transaction initiated by the processing unit 101.

The code generation unit 151 outputs an output value 152, and is arranged to select the output value as being either the data received from the input data bus 111 or as a replacement value, representing a replacement instruction. The replacement instruction is preferably stored in an appropriate instruction memory which may be provided as a component part of the code generation unit 151 and may store one or more instructions. Where a plurality of instructions are stored, the code generation unit 151 may be arranged to make a selection between one of the plurality of stored instructions to be placed on the output data bus 112 as the output value 152, if the value from the input data bus 111 is not selected.

The patching system may comprise more than one patching group, named a patch entry. Each patch entry may comprise an address register 120, a distance calculator unit 130 and distance indication 150 as set forth above. A control register 140 may be provided as part of each patch entry, or alternatively a single control register can be provided as part of the patching circuit as will be described below. The configuration unit 104 may be configured to receive an indication of which group to program with the given address and data. The code generation unit 151 may be configured to receive the corresponding set of inputs from each one of the patching entries. Whenever the code generation unit 151 receives a matching indication (which may be a distance indication within a predefined range of values) from more than one of the patching entries, the code generation unit 151 may decide to keep and process only one of the matching distance indication signals 150 and ignore the remaining. The decision may be of any kind, for example it may keep the matching distance indication derived from the patching entry with the smaller or the larger identification number. It may be further configured to keep the matching distance indication with the minimum absolute value. This way collisions may be resolved. Other similar techniques could be also followed in the decision sub block of the code generation unit in order to resolve any kind of collisions among the signals coming from the multiple patching entries.

Figure 2:
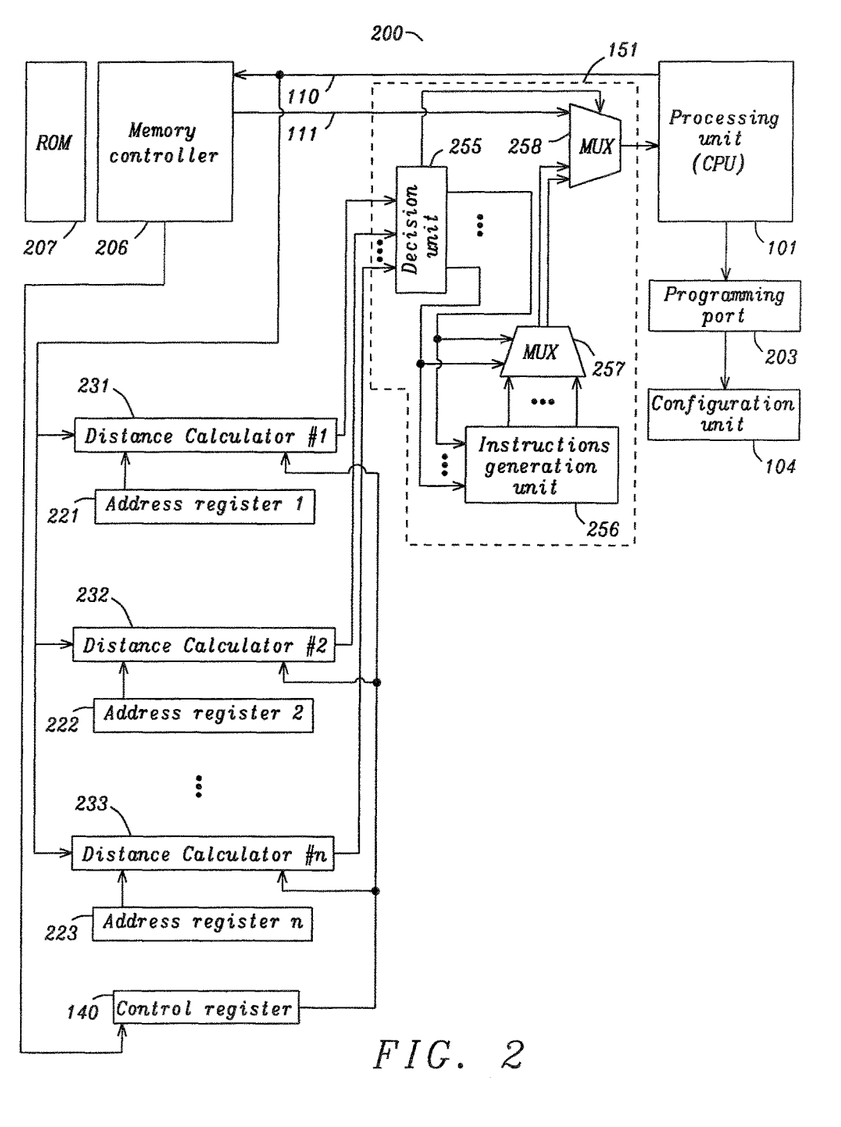
FIG. 2 is a diagram illustrating aspects of a system for patching a memory including a patching circuit comprising several patching entries.

FIG. 2 is a diagram illustrating in more detail an example of a system 200 for patching a memory including a patching circuit comprising several address registers 221, 222, 223. Each address register 221, 222, 223 may be accompanied by a distance calculator 231, 232, 233. Each address register 221, 222, 223 may be examples of the address register 120 of FIG. 1, while each of the distance calculators 231, 232, 233 may be examples of the distance calculation unit 130 of FIG. 1.

The code generation unit 151 in FIG. 1 corresponds to the dashed area 151 of FIG. 2, wherein the dashed area exposes the sub blocks that may implement the logic of the code generation unit 151 of FIG. 1, according to this specific embodiment. This code generation unit 151 may be configured to include a decision unit 255, which will collect the distance indication information provided by all distance calculators 231,232,233 and will control an instruction generation unit 256, a first multiplexing unit 257 and a second multiplexing unit 258, generating eventually the output value 152 which will be forwarded via the output data bus 112 to the processing unit 101.

The code generation unit 151 may be configured to include an instruction generation unit 256. The purpose of this unit is to implement the required sequence of instruction opcodes in order to implement the predefined injected code. This unit may generate sets of assembly instructions of any type and of any division of a memory word, including a set of 4 single byte (8 bits each) instructions or a set of 2 half-word (16 bits each) instructions or a single word (32 bits wide) instruction, depending on the ISA of the given processing unit 101 and the selected code to be injected. The instruction generation unit 256 may be a circuit that selects an opcode from a predefined list of opcodes depending on the value of the corresponding address register 221,222,223 and the distance indication values from the distance calculators 231,232,233. It may be further configured to modify dynamically the opcode in order to form the final assembly instruction, depending on the value of the distance indication or the corresponding address register 232,232,233.

This dynamically adapted and generated set of assembly instructions provided by the instruction generation unit 256 may be configured to implement the redirection of the execution flow of the CPU, but it may also be configured to implement other mechanisms as well, depending on the needs of the system. Implementing this instruction generation unit with a hard coded combinatorial logic will consume the minimum substrate area and will provide the minimum response time and latency to the system. Depending on the final requirements of the system, this unit may be implemented also by other ways, either hard coded or reconfigurable, either as combinatorial or as sequential logic, either storing the hard coded opcodes in combinatorial logic or in any kind of reprogrammable or any general kind of array.

The code generation unit 151 may be configured to also include a first multiplexing unit 257. The first multiplexing unit 257 may be configured to select and order the correct instruction set. The code generation unit 151 may also further configured with a second multiplexing unit 258, which will combine the data bus 111 with the decided instruction set provided from the first multiplexing unit 257, constructing and providing thus the final output value to the processing unit 101.

Figure 3:
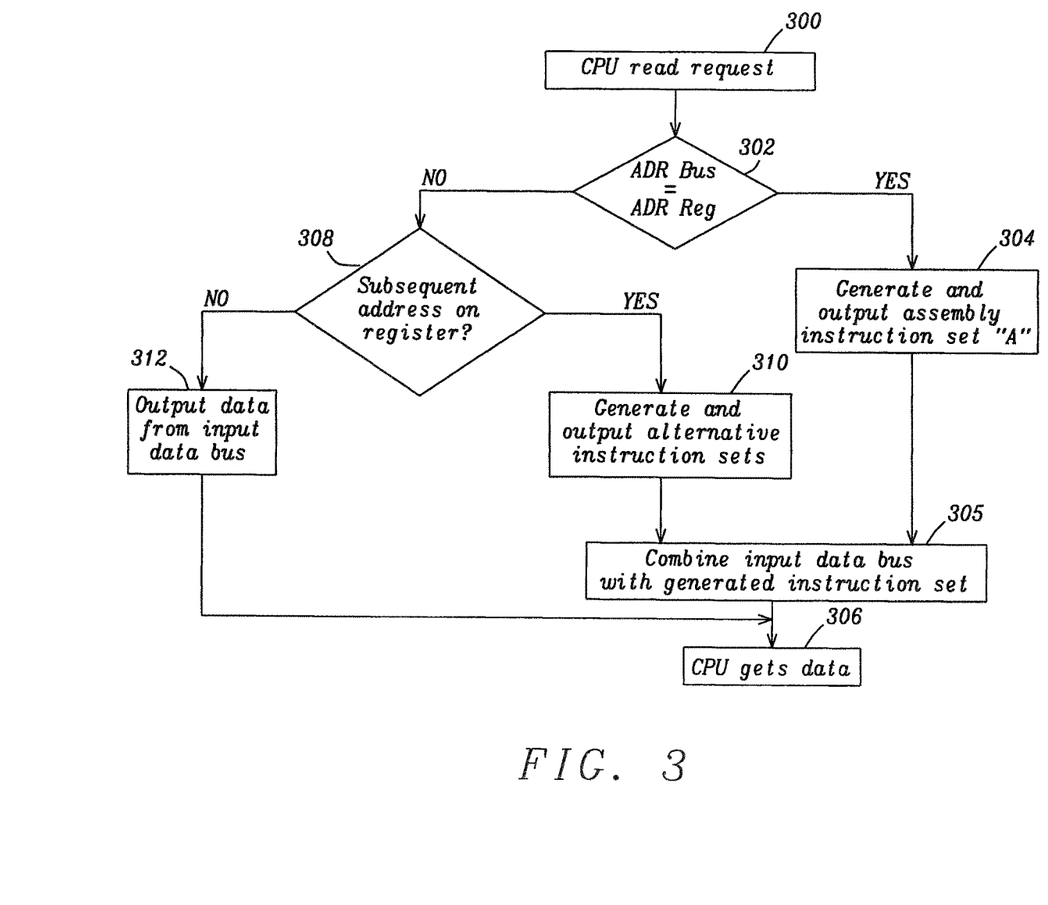
FIG. 3 is a flowchart illustrating the system in operation.

FIG. 3 is a flowchart illustrating the circuit of FIG. 1 in operation. In step 300 the processing unit 101 requests to read a word, for example data or an instruction, from a particular memory address via the address bus 110. The memory 102 puts the corresponding word on the input data bus 111. Simultaneously or sequentially, the distance calculator unit 130, in step 302, checks to see if the address on the address bus 110 matches exactly with the address register 120, in other words it checks if the distance is zero "0".

If the distance calculator unit 130 detects an exact match (of distance zero "0"), then at step 304 the instruction generation unit 256 generates and outputs an assembly instruction set, labelled here as assembly instruction set "A", which is first combined with the input data bus 111 (represented with the step 305 of FIG. 3) and sent to the processing unit 101 at step 306.

If the distance calculator unit 130 does not detect an exact match (i.e. of distance "0"), then at step 308 the distance calculator unit 130 further checks if distance indication 150 value is within the predefined maximum value k. If there is a match within this range of values, then an alternative assembly instruction set is generated, at step 310 and sent to the processing unit 101, at steps 305 and 306.

If the distance calculator detects that the distance of address bus 110 and address register 120 is larger than the predetermined range, then at step 312 the data from the input bus 111 is sent to the processing unit 101 at step 306. In that case, no code is injected by the code generation unit 151.

The decisions made from 302 and 308 may be implemented by the decision unit 255 of FIG. 2. The generation of the corresponding instruction sets of 304 and 310 may be implemented by the instruction generation unit 256 and the first multiplexing unit 257. The combination of the instruction sets with the input data bus 111 or even the forwarding of the input data bus 111 to the processing unit 101, denoted by steps 305 and 306, may be implemented by the second multiplexing unit 258 of FIG. 2.

Figure 4:
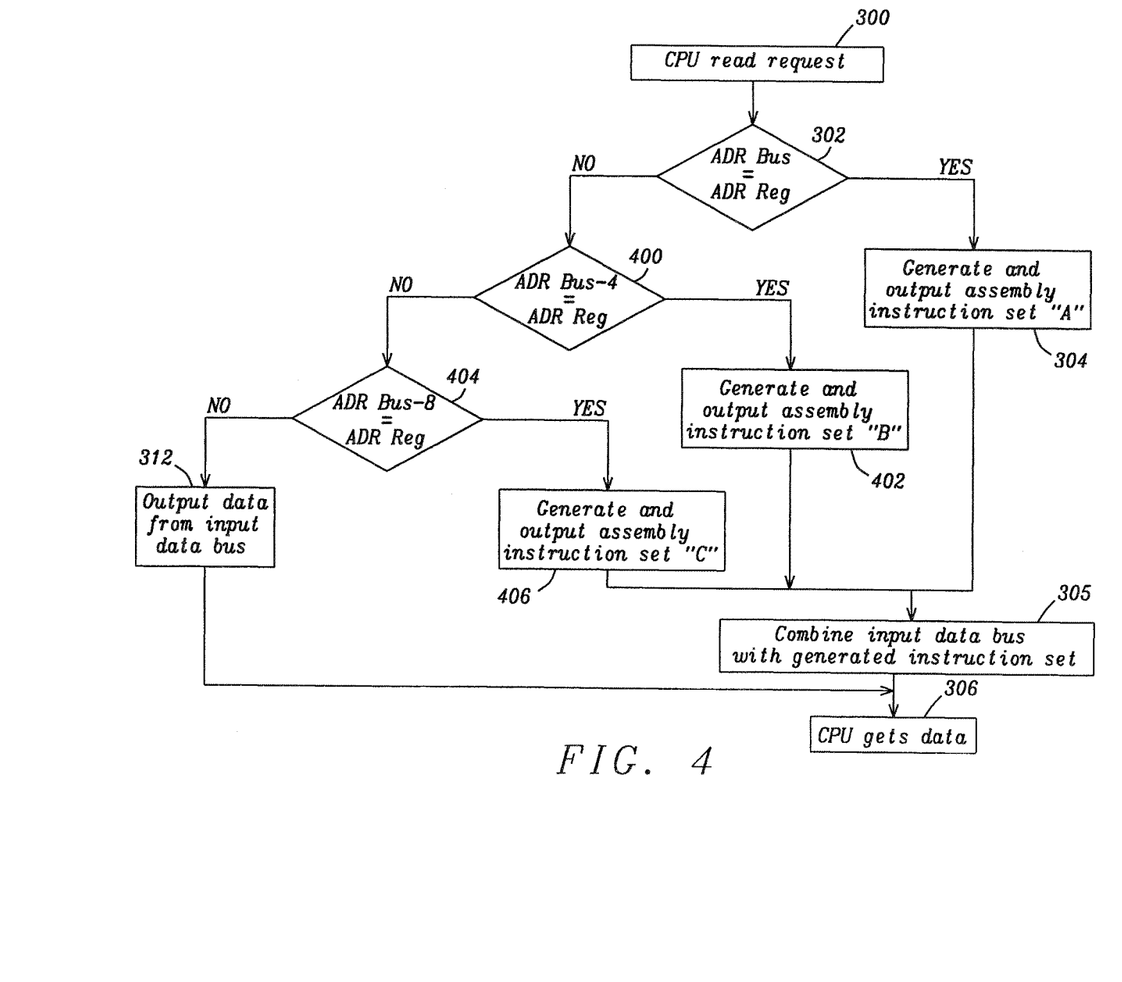
FIG. 4 is a flowchart illustrating further aspects of the system in operation.

FIG. 4 is a flowchart illustrating the circuit of FIG. 1 in operation, for the specific example of a 32 bit system as mentioned above. Here, steps that are common with FIG. 3 are illustrated with like reference numerals. In FIG. 4, as with FIG. 3, in step 300 the processing unit 101 requests to read a word, which is checked versus the address register 120 at step 302, and if there is an exact match, a first assembly instruction set "A" is generated and output at step 304 so that it will be combined with the input data bus 111 at step 305 end eventually will be sent to the processing unit 101 at step 306.

In this embodiment of FIG. 4, if the address on the address bus 110 does not match exactly with the address register 120, then at step 400 the distance indication may indicate that the distance is one word, or else 4 bytes in this embodiment. If there is a match in step 400, then at step 402 a second assembly instruction set "B" is generated and combined with the input data bus in step 305, so that the processing unit 101 receives the modified data at step 306.

If there is no match at step 400, then at step 404 a third check is performed in parallel or sequentially with the other checks whether the distance between address bus 110 and address register 120 is 2 words, or else 8 bytes. If there is a match, then at step 406 a third assembly instruction set "C" is generated and output so that it will be combined with the data bus 111 in step 305 and provided to the processing unit 101 at step 306. If there is no match at step 404, then it is considered that the distance is beyond the predefined limit and at step 312 the data from the input data bus 111 will not be modified and it will be forwarded as is to the processing unit 101 at step 306.

Figure 5:
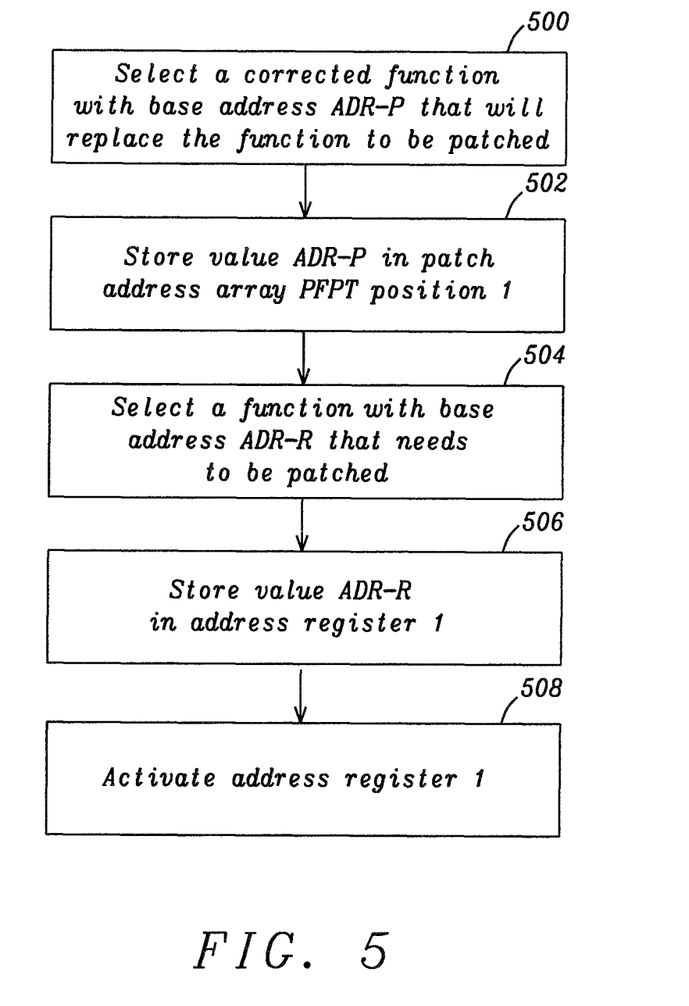
FIG. 5 is a flowchart of a method of programming a patching circuit.

FIG. 5 is a flowchart of a method of programming a patching circuit. At step 500, a corrected function is selected, with a base address ADR_P that will replace the function or other data to be patched. At step 502 the memory address ADR_P is stored in the first position of an array that stores the pointers of the functions that will replace (patch) the problematic functions. This array of function pointers may be located in any read/write memory area accessible by the processing unit 101, located at any location of the system architecture, inside or outside from the SoC. This array of function pointers may be called Patch Function Pointer Table, or else PFPT. At step 504 a function is selected with a base address ADR_R which needs to be patched or else replaced. At step 506 the memory address ADR_R is stored in the address register 221 of FIG. 2, here being patching entry 1. This step may comprise, for example, sending a request to the configuration unit 104 to store the ADR_R value into the address register 221. At step 508, the programmed address register is activated by sending another request to the configuration unit 104 to set the control register 140 to the appropriate value. The same process can be followed for all available patch entries, programming the proper entries of the PFPT table and registers.

Any number of patching entries (distance calculator and address register pairs), may be implemented according to the foreseen number of patches that may be required after the fabrication of the System on Chip (SoC). The control register 140 may selectively enable or disable each one of the patch entries.

A programming port 203 may be provided and coupled with the configuration unit 104 that is configured to program the address registers 221,222,223 (interconnecting lines not shown in the drawing for clarity reasons) and the control register 140. The programming port 203 can be accessed and programmed by the processing unit 101, or by any other processing unit of the system. The bus interface of the programming unit may be of any kind and may be attached to any location of the SoC architecture, allowing the access from the corresponding processing unit. In FIG. 2, as an example, the programming port 203 is attached to processing unit 101 with direct connection, providing an example and without limiting all the possible implementation alternatives.

As mentioned above, the present disclosure is not limited to any particular type of processor or ISA. However to further aid the reader in understanding the disclosure, we shall now discuss in more detail a specific case study, of an ARM Cortex-M0 processor, which implements the smallest subset of the ARMv6-M architecture.

Cortex-M0 provides a solution with a special instruction named "SuperVisor Call" (with acronym "SVC #N"). This is a 16 bit wide assembly instruction which can be used for function patching. The usage of this instruction introduces some constraints to the final application code. First it requires keeping the interrupts enabled during any function call. Secondly, it switches the processing state into exception mode. Third the SVC handler must have the highest priority among all interrupts. The last two side effects mean that during the execution of the SVC handler, i.e. the execution of the corrected function, no other interrupt handler can execute, which cause problems especially for real time systems. The second side effect means that the CPU state switches into privileged execution state, which can cause problems especially on systems that use an operating system.

The following describes various example implementations for this processor, describing different possible assembly codes that can be injected. It will be appreciated that other implementations are possible. There can be of course plenty of variations for the specific ISA and also other variations for any other ISA. The basic structure of the following code sequences follow also the philosophy of the macro code named "veneer" that the C Compiler typically uses. The "veneer" macro typically extends the range of a branch by becoming the intermediate target of the branch instruction. The code of this small intermediate function can be used as a starting point for a given ISA to construct the final code that may be injected by a patching circuit.

Implementation A:

Here we consider that the aforementioned Patch Function Pointer Table (PFPT) will be located at a fixed location of the system's memory map and specifically in this example at address 0xC0 hexadecimal value, which is the end of the Vector Table of the given ISA. The maximum number of function patch entries is 32, which means that it may be decided to implement any number of patching entries between 1 and 32. During the execution by the processing unit 101 of the code injected by the patching circuit the processing unit will index and fetch from the PFPT the entry that corresponds to the matching hardware patch entry with identification number "P". The patching circuit (via the code generation unit 151) will inject in total five instructions which are 16 bits (half-word) wide. Referring to FIG. 1, the five half-word instructions will require a distance calculator unit 130 that will be able to detect a distance of up to three words between the address bus 110 and the address register 120.

The injected assembly code is:

| | | |
|---|---|---|
| PUSH | {r0,r1} | ; save r0 and reserve an extra position at the stack |
| MOVS | r0,#0xC0 | ; Load the base address of Patch Table (value of less than 0xFC). |
| LDR | r0,[r0,#(4*P)] | ; Select the patch function adding the offset in the table (P=0..31) |
| STR | r0,[sp,#0x04] | ; Store value of r0 to the reserved position in stack |
| POP | {r0,pc} | ; restore r0 and save to PC the value of the reserved stack position |

The instruction generation unit 256 of FIG. 2, should be configured to generate the opcodes corresponding to this code sequence. Especially for the third instruction, the instruction generation unit 256 may be further configured to dynamically construct the correct instruction opcode in order to refer to the correct patch entry P.

Implementation A is suitable for most cases since it provides a good balance between the required substrate area and maximum available number of patching entries.

Implementation B:

The implementation B is a variant of implementation A, where in order to overcome the limitation of 32 patch entries, we have added one more instruction, thus providing up to 95 patch entries. The extra hardware requirements are relatively limited. It will require a distance calculator unit 130 of FIG. 1 that will be able to detect a distance of up to four words.

The final injected code will be:

| | | |
|---|---|---|
| PUSH | {r0,r1} | ; save r0 and reserve an extra position at the stack |
| MOVS | r0,#0xC0 | ; Load the base address of Patch Table (value of less than 0xFC). |
| ADDS | r0, r0, #(4*P0) | ; first patch function selection (P0=0..63 entries) |
| LDR | r0,[r0, #(4*P1)] | ; P1=0..31, corresponding to P=63..94 (max operant value 0x7C) |
| STR | r0,[sp,#0x04] | ; Store value of r0 to the reserved position in stack |
| POP | {r0,pc} | ; restore r0 and save to PC the value of the reserved stack position |

Implementation C:

In this variation, the PFPT patch table can be located at any position of the system memory. The maximum number of function patching entries is 32. During the execution of the injected code, the processing unit 101 will index the PFPT entry that corresponds to the matching hardware patch entry "P", in order to fetch the base address of the correct function and then to branch to this address.

The code generation unit 151 will inject in total 7 or 8 half-word instructions (of 16 bit wide each), depending on the alignment of the function's base address. In other words depending on the base address, if it is word or half-word aligned in the memory array 102. The code generation unit 151 may detect the alignment of the function's base address by fetching the second least significant bit of the address register 120. The distance calculator 130 may be configured to be able to detect a distance of up to five words.

Implementation C requires also an extra single register, which is not described in FIGS. 1 and 2. It will be used by all patching entries and the configuration unit 104 may be able to index and program any value in this register. This register may configured to store a word with enough register bits to encode an address that the processing unit will use in order to index the PFPT. During the programming of the patching circuit (as described in FIG. 5) there must be an extra programming step, where the "_patch_table_ptr" value may be stored in this register.

If the base address of the function is word aligned then the injected assembly code will require a dummy half-word (refer to instruction "NOP"). If it is not word aligned then the dummy instruction "NOP" may be skipped. The decision to skip or not the dummy instruction will be made by the instruction generation unit 256. The code listing will be:

```
PUSH    {r0,r1}         ; save r0 and reserve an extra position at the stack
LDR     r0,[pc,#8]
LDR     r0,[r0,#(4*P)]  ; P=0..31 (max operant value 0x7C)
STR     r0,[sp,#0x04]
POP     {r0,pc}
NOP                     ; this dummy half-word will be conditionally required to
                          word align the pointer
DCW     _patch_table_ptr_low ; Value stored in a hardware register.
DCW     _patch_table_ptr_high
```

Implementation D:

This implementation is the same with Implementation C, with the only difference that there is no limitation to the number of the patch entries.

The extra cost of implementation D with regards to the cost in hardware of implementation C is the addition of one more arithmetic unit, not described in FIGS. 1 and 2. This new unit should implement the equation provided below the following assembly listing. The equation requires an arithmetic shifter and an adder. The unit may configured to receive as first input the value of the register "_patch_table_index_ptr", described in the Implementation C. It may be further configured to receive as second input the identification number of the matching patching entry. The instruction generation unit 256 may be further configured to split the output of this arithmetic unit into two half-words and will provide them to the first multiplexing unit 257 in order to construct the proper instruction set.

The injected assembly code may be:

```
PUSH    {r0,r1}         ; save r0 and reserve an extra position at the stack
LDR     r0,[pc,#8]
LDR     r0,[r0,#0x0]
STR     r0,[sp,#0x04] POP {r0,pc}
NOP                     ; this dummy half-word will be conditionally required to
                          word align the pointer
DCW     _patch_table_index_ptr_low ; Value stored in a hardware
                          register.
DCW     _patch_table_index_ptr_high
```

Note:
_patch_table_index_ptr = _patch_table _ptr + 4*P, implemented in hardware

It should be noted that the above-described embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

The invention claimed is:

1. A memory patching circuit comprising:
a code generation unit coupled with a memory via an input data bus and coupled with a processor via an output data bus;
an address memory storing an address of a location in the memory to be patched;
a distance calculator unit arranged to:
receive a first address from an address bus connecting the memory and the processor,
receive a second address from the address memory,
compare the first and second addresses, and output a distance indication based on the comparison;
wherein the code generation unit is arranged to receive the distance indication and to either pass through data from the input data bus to the output data bus or to inject code to the output data bus, based on the distance indication; and
wherein the code generation unit is arranged to receive the address from the address memory to determine the location for the injected code.

2. The memory patching circuit of claim 1, wherein the distance calculator is arranged to subtract the first address from the second address and provide a signed value as the distance indication.

3. The memory patching circuit of claim 1, wherein the distance calculator unit comprises a plurality of subtractors each coupled to the address bus and arranged to subtract successive offsets from the first address.

4. The memory patching circuit of claim 3, wherein the distance calculator unit comprises a plurality of comparators each coupled with one of said subtractors, and the outputs of the comparators provide the distance indication.

5. The memory patching circuit of claim 1, wherein the distance calculator unit comprises a plurality of adders each coupled to the address memory and arranged to add successive offsets from the second address.

6. The memory patching circuit of claim 5, wherein the distance calculator unit comprises a plurality of comparators each coupled with one of said adders, and the outputs of the comparators provide the distance indication.

7. The memory patching circuit of claim 1, wherein the distance indication indicates whether the logical distance between the first address and the second address is within a predetermined range.

8. The memory patching circuit of claim 7, wherein, if the logical distance between the first address and the second address is within the predetermined range, the distance indication represents the distance and, if the logical distance between the first address and the second address is not within the predetermined range, the distance indication indicates that no address within the range has been found.

9. The memory patching circuit of claim 1, comprising a control signal generator which sends a control signal to enable or disable operation of the memory patching circuit.

10. The memory patching circuit of claim 9, wherein the control signal generator comprises a control memory and a configuration unit arranged to write a value to the control memory.

11. The memory patching circuit of claim 9, wherein the control signal generator is coupled with the distance calculator unit.

12. The memory patching circuit of claim 11, wherein a control signal for disabling the memory patching circuit or disabling the patching entry associated with the distance calculator unit, causes the distance calculator unit to output a distance indication indicating that no address within the range has been found.

13. The memory patching circuit of claim 9, wherein the control signal generator is coupled with the code generation unit.

14. The memory patching circuit of claim 13, wherein a control signal for disabling the memory patching circuit or disabling a specific patching entry, causes the code generation unit to ignore any positive distance indication within the predetermined limits to be ignored, considering that no matching has been detected from the disabled patching entry, regardless of the output of the corresponding comparison unit.

15. The memory patching circuit of claim 1, comprising a configuration unit for storing a memory address in the address memory.

16. The memory patching circuit of claim 1, comprising a plurality of patching groups, each group comprising an address register and a distance calculator unit.

17. The memory patching circuit of claim 16, wherein each patching group further comprises a control register for outputting a control signal.

18. The memory patching circuit of claim 16, comprising a memory storing a table with pointers to replacement functions, one for each patch group.

19. The memory patching circuit of claim 1, wherein the code generation unit comprises an instruction generation unit arranged to implement a required sequence of instruction opcodes in order to implement the predefined injected code.

20. The memory patching circuit of claim 19, wherein the code generation unit comprises a decision unit arranged to receive distance indications from the or each distance calculator unit and to control the data output to the output data bus based on the received distance indications.

21. A system comprising;
a memory;
a processor;
an address bus coupled between the memory and the processor; and a memory patching circuit comprising:
a code generation unit coupled with a memory via an input data bus and coupled with a processor via an output data bus;
an address memory storing an address of a location in the memory to be patched;
a distance calculator unit arranged to:
receive a first address from an address bus connecting the memory and the processor,
receive a second address from the address memory,
compare the first and second addresses, and output a distance indication based on the comparison;
wherein the code generation unit is arranged to receive the distance indication and to either pass through data from the input data bus to the output data bus or to inject code to the output data bus, based on the distance indication; and
wherein the code generation unit is arranged to receive the address from the address memory to determine the location for the injected code.

22. A method of patching a memory comprising replacing a plurality of memory positions with hardcoded assembly instructions;
at a distance calculator unit;
receiving a first address from an address bus connecting a memory and a processor,
receiving a second address from an address memory, comparing the first and second addresses, and obtaining a distance indication based on the comparison; and
at a code generation unit;
either passing through data from an input data bus to an output data bus or injecting code to the output data bus, based on the distance indication; and
wherein the code generation unit is arranged to receive the address from the address memory to determine the location for the injected code.

23. The method of claim 22, comprising dynamically generating the hardcoded assembly instructions.

* * * * *